(No Model.)

J. H. WHITEHEAD & W. E. LAYLAND.
DRAWING-OFF ROLLERS FOR COMBING MACHINES.

No. 540,935. Patented June 11, 1895.

WITNESSES.
Ernest Pyrah
James Holmes

INVENTORS.
John Henry Whitehead
William Edward Layland

UNITED STATES PATENT OFFICE.

JOHN HENRY WHITEHEAD AND WILLIAM EDWARD LAYLAND, OF LEEDS, ENGLAND.

DRAWING-OFF ROLLER FOR COMBING-MACHINES.

SPECIFICATION forming part of Letters Patent No. 540,935, dated June 11, 1895.

Application filed December 11, 1894. Serial No. 531,520. (No model.)

*To all whom it may concern:*

Be it known that we, JOHN HENRY WHITEHEAD and WILLIAM EDWARD LAYLAND, subjects of Her Majesty the Queen of Great Britain, residing at Leeds, in the county of York, England, have invented a certain new and useful Improvement in Drawing-Off Rollers for Combing-Machines, Gill and Drawing Boxes, Wool-Washing, and Like Machines, of which the following is a specification.

Our invention relates to an improvement in apparatus designed for application to the nip and drawing off rollers of fiber combing machines, rollers of gill and drawing boxes, wool washing machines and to the rollers of domestic wringing and mangling machines the object of the invention being to balance or insure an equal amount of pressure on each end of the roller or rollers to which the apparatus is applied.

Figure 1:
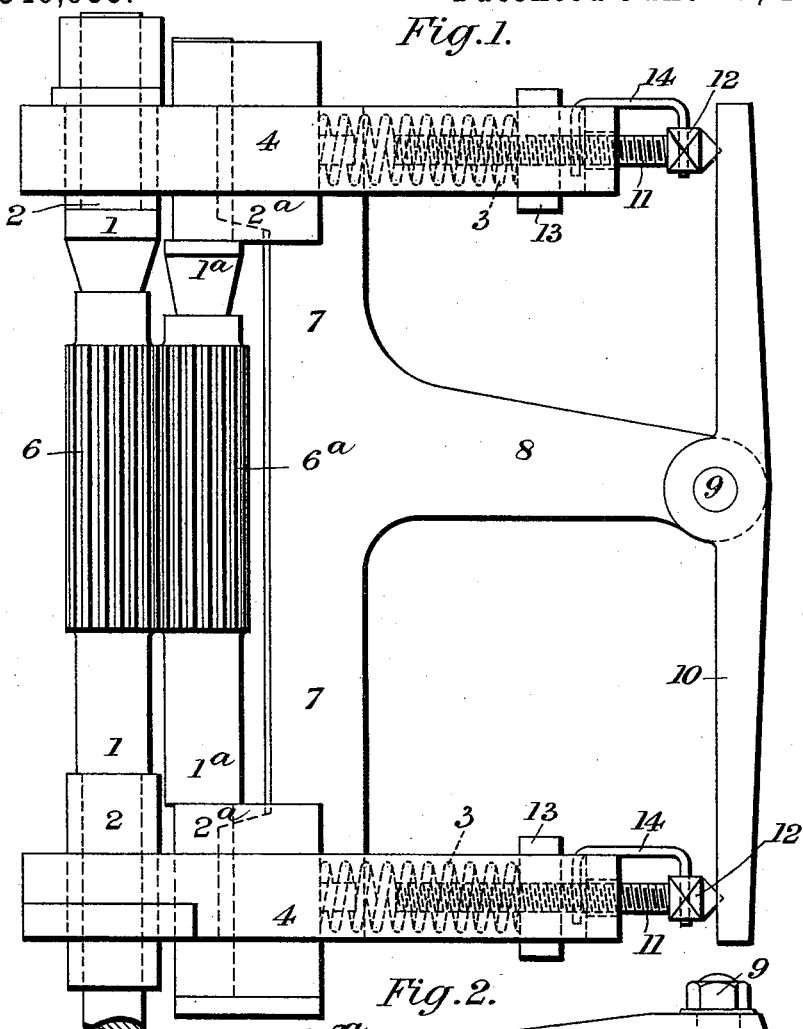
Figure 2:
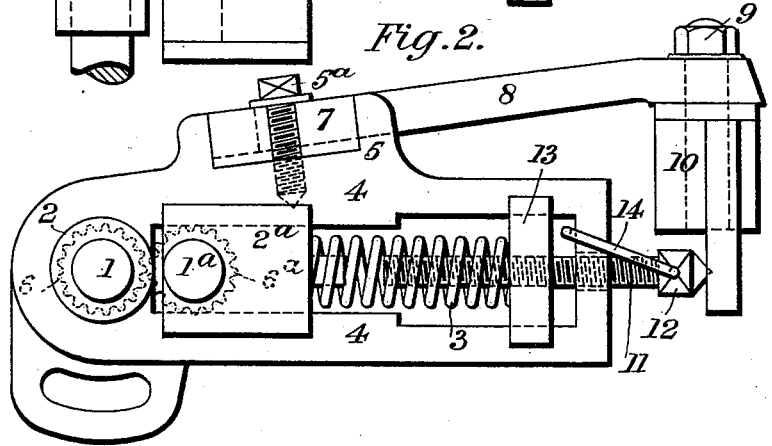

In the accompanying drawings, Figure 1 is a side elevation of one form of our apparatus as applied to the drawing-off rollers of a combing-machine. Fig. 2 is an end elevation of same.

As shown the necks 1, $1^a$ and brasses 2, $2^a$ of the fixed and movable rollers 6, $6^a$ are carried in oblong straps or brackets 4, spiral springs 3 being employed to support the movable brasses $2^a$ of the movable rollers $6^a$ as usual. Secured to the projection 5 of the straps or brackets 4 either by casting therewith or by a screw $5^a$ is an arm 7 from the center of which projects an arm 8 in the end of which is a bolt or stud 9 on which is pivoted a lever 10 the outer ends of which are opposite the top and bottom straps or brackets 4. Projecting from the ends of the latter are adjusting screws 11 having squared heads 12 for the application of a key. These screws pass through clear holes in the straps and have on their ends nuts 13 which slide in the cut away portions of the straps, the nuts being grooved on the sides so as to be guided thereby. These nuts 13 bear on the spiral springs 3 the ends of the screws 11 passing into the springs and acting as guides therefor. The squared heads 12 (which may have pointed extremities as shown) bear against the ends of the lever 10 so that as the screws 11 or either of them is turned in one or the other direction so will they act on the nuts 13 and on the lever 10 one end of the latter being caused to move inward by an outward movement of the other end so that the pressure is equalized and evenly distributed on both springs 3 and on the brasses $2^a$ of the movable roller $6^a$.

Bent locking pins 14 may be employed for preventing the screws 11 from moving such pins being dropped at one end into holes in the heads 12 while the other ends engage in the cut away portions of the straps 4.

What we claim is—

In combination, a pair of rollers, one of which is movable, springs for supporting the ends of the movable roller; the straps 4; adjusting screws 11, having heads 12; and nuts 13; the latter movable in the straps and bearing on the springs; an arm 8 secured to the straps; a lever 10 pivoted to said arm, the free ends of said lever bearing on the heads of the screws to balance the pressure on the springs and movable roller, through the nuts 13, substantially as described.

In testimony whereof we have hereunto set our hands in the presence of two subscribing witnesses.

JOHN HENRY WHITEHEAD.
WILLIAM EDWARD LAYLAND.

Witnesses:
ERNEST PYRAH,
JAMES HOLMES.